(12) United States Patent
Lu

(10) Patent No.: US 9,376,066 B2
(45) Date of Patent: Jun. 28, 2016

(54) VEHICULAR CAMERA WITH VARIABLE FOCUS CAPABILITY

(75) Inventor: Yuesheng Lu, Farmington Hills, MI (US)

(73) Assignee: MAGNA ELECTRONICS, INC., Auburn Hills, MI (US)

( * ) Notice: Subject to any disclaimer, the term of this patent is extended or adjusted under 35 U.S.C. 154(b) by 287 days.

(21) Appl. No.: 14/112,342

(22) PCT Filed: Apr. 17, 2012

(86) PCT No.: PCT/US2012/033933
§ 371 (c)(1),
(2), (4) Date: Oct. 17, 2013

(87) PCT Pub. No.: WO2012/145313
PCT Pub. Date: Oct. 26, 2012

(65) Prior Publication Data
US 2014/0036084 A1    Feb. 6, 2014

Related U.S. Application Data

(60) Provisional application No. 61/476,602, filed on Apr. 18, 2011.

(51) Int. Cl.
| | | |
|---|---|---|
| *G02B 3/14* | (2006.01) |
| *B60R 11/04* | (2006.01) |
| *H04N 5/225* | (2006.01) |
| *G02B 26/00* | (2006.01) |
| *H04N 5/232* | (2006.01) |
| *G02B 7/02* | (2006.01) |
| *G02B 7/08* | (2006.01) |
| *G02B 27/00* | (2006.01) |

(52) U.S. Cl.
CPC . *B60R 11/04* (2013.01); *G02B 3/14* (2013.01); *G02B 26/005* (2013.01); *H04N 5/2254* (2013.01); *H04N 5/23212* (2013.01); *G02B 7/028* (2013.01); *G02B 7/08* (2013.01); *G02B 27/0006* (2013.01)

(58) Field of Classification Search
None
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,715,093 A | 2/1998 | Schierbeek et al. |
| 5,760,962 A | 6/1998 | Schofield et al. |
| 5,796,094 A | 8/1998 | Schofield et al. |
| 5,877,897 A | 3/1999 | Schofield et al. |

(Continued)

OTHER PUBLICATIONS

International Search Report and Written Opinion dated Aug. 3, 2012 for PCT Application No. PCT/US2012/033933.

*Primary Examiner* — Eileen Adams
(74) *Attorney, Agent, or Firm* — Gardner, Linn, Burkhart & Flory, LLP

(57) ABSTRACT

A vehicular camera has a lens assembly, a housing and an image sensor. The lens assembly has at least one adjustable lens and a lens adjustment structure. The lens assembly has an effective focal length and an optical axis associated therewith and an effective distance from the image sensor. A controller may be operatively connected to the lens adjustment structure for controlling the operation of the lens adjustment structure. The lens adjustment structure is controllable to adjust at least one of an effective focal length and an effective distance of the lens assembly to the image sensor, so as to control the distance at which an object in the field of view of the camera appears in focus on the image sensor.

7 Claims, 9 Drawing Sheets

(56) References Cited

U.S. PATENT DOCUMENTS

| | | |
|---|---|---|
| 6,201,642 B1 | 3/2001 | Bos |
| 6,313,454 B1 | 11/2001 | Bos et al. |
| 6,320,176 B1 | 11/2001 | Schofield et al. |
| 6,353,392 B1 | 3/2002 | Schofield et al. |
| 6,369,954 B1 | 4/2002 | Berge et al. |
| 6,396,397 B1 | 5/2002 | Bos et al. |
| 6,498,620 B2 | 12/2002 | Schofield et al. |
| 6,559,435 B2 | 5/2003 | Schofield et al. |
| 6,590,719 B2 | 7/2003 | Bos |
| 6,690,268 B2 | 2/2004 | Schofield et al. |
| 6,717,610 B1 | 4/2004 | Bos et al. |
| 6,757,109 B2 | 6/2004 | Bos |
| 6,806,452 B2 | 10/2004 | Bos et al. |
| 6,822,563 B2 | 11/2004 | Bos et al. |
| 6,824,281 B2 | 11/2004 | Schofield et al. |
| 6,831,261 B2 | 12/2004 | Schofield et al. |
| 6,853,507 B2 | 2/2005 | Ryu et al. |
| 6,922,292 B2 | 7/2005 | Bos |
| 6,946,978 B2 | 9/2005 | Schofield |
| 7,004,606 B2 | 2/2006 | Schofield |
| 7,005,974 B2 | 2/2006 | McMahon et al. |
| 7,031,071 B2 | 4/2006 | Nishioka |
| 7,038,577 B2 | 5/2006 | Pawlicki et al. |
| 7,083,096 B2 | 8/2006 | Breytman et al. |
| 7,123,168 B2 | 10/2006 | Schofield |
| 7,382,545 B2 | 6/2008 | Jung et al. |
| 7,720,580 B2 | 5/2010 | Higgins-Luthman |
| 7,965,336 B2 | 6/2011 | Bingle et al. |
| 8,179,438 B2 | 5/2012 | Hayakawa et al. |
| 8,542,451 B2 | 9/2013 | Lu et al. |
| 2005/0167862 A1* | 8/2005 | Sano ............................. 264/1.1 |
| 2005/0270486 A1* | 12/2005 | Teiwes et al. ................ 351/209 |
| 2007/0279365 A1* | 12/2007 | Kageyama .................... 345/100 |
| 2008/0106811 A1* | 5/2008 | Eromaki ....................... 359/817 |
| 2009/0244361 A1 | 10/2009 | Gebauer et al. |
| 2010/0007807 A1 | 1/2010 | Galstian et al. |
| 2010/0020170 A1 | 1/2010 | Higgins-Luthman et al. |
| 2010/0243862 A1* | 9/2010 | Nunnink .................... 250/201.2 |
| 2010/0265048 A1 | 10/2010 | Lu et al. |
| 2010/0289885 A1 | 11/2010 | Lu et al. |
| 2012/0062743 A1 | 3/2012 | Lynam et al. |
| 2012/0154591 A1 | 6/2012 | Baur et al. |
| 2012/0218412 A1 | 8/2012 | Dellantoni et al. |

\* cited by examiner

VEHICULAR CAMERA WITH VARIABLE FOCUS CAPABILITY

CROSS REFERENCE TO RELATED APPLICATIONS

The present application is a 371 national phase filing of PCT Application No. PCT/US2012/033933, filed Apr. 17, 2012, which claims the benefit of U.S. provisional application Ser. No. 61/476,602, filed Apr. 18, 2011, which is hereby incorporated herein by reference in its entirety.

FIELD OF THE INVENTION

The present invention relates to cameras for use in vehicles and in particular to forward-facing and rear facing cameras for use in vehicles.

BACKGROUND OF THE INVENTION

A typical camera for mounting on a vehicle has a lens assembly that is fixed in position in the camera housing. This, however has disadvantages associated with it. One disadvantage is that it limits the functionality of the camera. If the camera is configured to focus on objects that are 7 meters in front of the vehicle, then the camera cannot effectively be used for functions that require it to focus on objects that are near the camera. If it is desired to provide a camera that focuses on objects that are near, it could entail the use of a separate camera from the one configured to focus on objects that are 7 meters away.

Furthermore, fixed focus cameras can be time consuming to adjust for focus initially during manufacture. A traditional solution is to use relatively expensive robotic equipment to carefully adjust the position of the lens assembly in the camera housing and to determine whether the camera is in focus after each adjustment. Once the camera is determined to be in focus, adhesive holding the lens assembly to the housing can then be cured or otherwise hardened. This particular step can be time consuming, which is generally not ideal in a high-volume production application.

There is a need for cameras that at least partially address these problems.

SUMMARY OF THE INVENTION

In a first aspect, the invention is directed to a vehicular camera that has a lens assembly, a housing and an image sensor. The lens assembly has an effective focal length and an effective distance to the image sensor. The lens assembly has a lens adjustment structure that is controllable to adjust at least one of the effective focal length and the effective distance of the lens assembly to the image sensor, so as to control the distance at which an object in the field of view of the camera appears in focus on the image sensor. In one embodiment, this adjustability permits the camera to be used for multiple purposes that require the camera to be able to focus on objects at different distances from the camera. For example, in some embodiments wherein sufficient adjustability is provided, the camera can be adjusted to be capable of capturing focused images of traffic signals and/or traffic signs and objects in front of the vehicle that represent potential collision risks, and the camera can also be adjusted to be capable of detecting rain on the windshield of the vehicle. In other embodiments, the range of adjustment of the camera is used during the manufacture of the camera, at the stage of production where the camera is assembled and it is adjusted so that images captured of objects at a selected distance from the camera appear in focus.

In an embodiment, the camera includes a housing, an image sensor positioned in the housing, a lens assembly and a controller. The lens assembly includes at least one adjustable lens and a lens adjustment structure. The lens assembly has a focal length and an optical axis associated therewith and an effective distance from the image sensor. The lens adjustment structure is operatively connectable to the at least one adjustable lens to control at least one property of the lens assembly selected from: the properties consisting of: the focal length of the lens assembly and the effective distance of the lens assembly from the image sensor. The controller is operatively connected to the lens adjustment structure for controlling the operation of the lens adjustment structure.

In a second aspect, the invention is directed to a method of focusing a camera having a housing, an image sensor and a lens assembly, comprising:

a) positioning a test image in the field of view of the camera;

b) powering up the camera;

c) adjusting the value at least one property of the lens assembly selected from the effective focal length of the lens assembly and the effective distance of the lens assembly from the image sensor;

d) capturing a camera image of the test image using the image sensor;

e) determining if the focus quality of the camera image meets or exceeds a selected quality threshold;

f) iteratively repeating steps c), d) and e) until the focus quality of the camera image meets or exceeds the selected quality threshold; and g) storing data related to the adjusted value of the at least one property of the lens assembly that permitted the focus quality of the camera image to meet or exceed the selected quality threshold.

Thereafter, when the camera is powered up any time, the stored data described in g) may be retrieved, so that the camera will focus the lens assembly by controlling the at least one property of the lens assembly to achieve the focus quality of camera image to meet or exceed the selected quality threshold.

Another aspect of the invention provides for use of the mechanical actuator in the camera design in the first embodiment to vaporize water droplets on lens surface and, thus, clean and avoid camera view blocked by water droplets on the lens surface.

Therefore, the present invention provides a vehicle camera with an adjustable focus lens assembly. The lens assembly has a lens adjustment structure that is controllable to adjust at least one of an effective focal length and an effective distance of the lens assembly to the image sensor, so as to control the distance at which an object in the field of view of the camera appears in focus on the image sensor. Such adjustability may permit the camera to be used for multiple purposes that require the camera to be able to focus on objects at different distances from the camera. The range of adjustment of the camera may be used during the manufacture of the camera, at the stage of production where the camera is assembled and it is adjusted so that images captured of objects at a selected distance from the camera appear in focus.

These and other objects, advantages, purposes and features of the present invention will become apparent upon review of the following specification in conjunction with the drawings.

BRIEF DESCRIPTION OF THE DRAWINGS

The present invention will now be described by way of example only with reference to the attached drawings, in which.

DETAILED DESCRIPTION OF THE INVENTION

Figure 1:
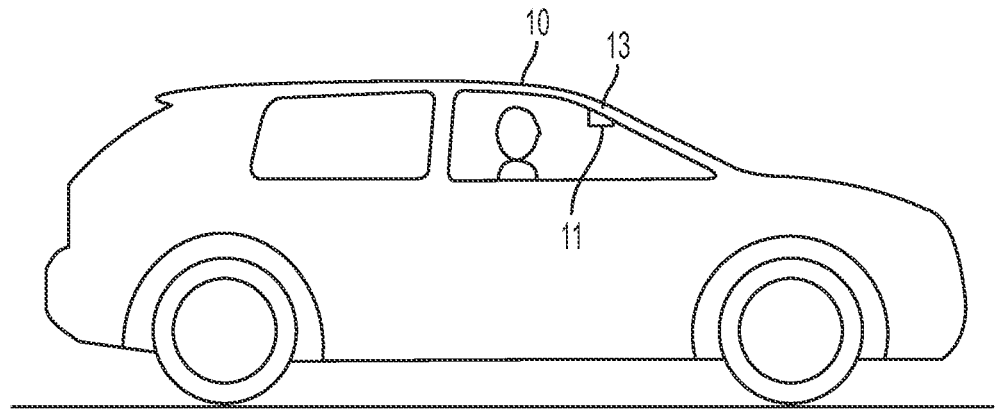
FIG. 1 is a side view of a vehicle with a camera in accordance with an embodiment of the present invention.

Reference is made to FIG. 1, which shows a vehicle 10 that includes a camera 11 in accordance with an embodiment of the present invention. The vehicular camera 11 is capable of adjusting its focus over a range of distances while remaining sufficiently robust for use in a vehicular environment. This capability permits the camera 11 to more successfully be used for a variety of functions including, but not limited to: collision avoidance, lane departure warning, lane keeping assistance traffic sign recognition and rain sensing). In the embodiment shown in FIG. 1, the camera 11 is forward facing and is behind the front windshield, shown at 13, of the vehicle 10.

Figure 2:
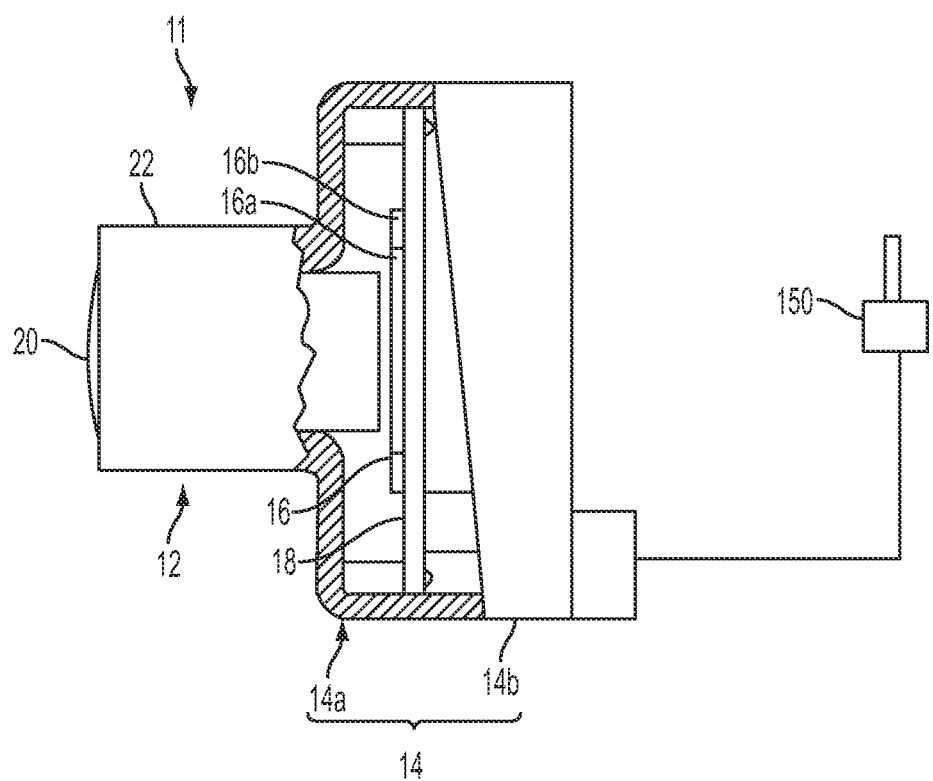
FIG. 2 is a magnified view of the camera shown in FIG. 1.

Reference is made to FIG. 2, which shows the camera 11 in greater detail. The camera 11 includes a lens assembly 12, a housing 14, which may include a lens holder 14a and a rear housing member 14b, an imager 16 and a camera microcontroller 18.

The imager 16 may be any suitable type of imager 16 such as any of the imager model nos. MT9V128, MT9V129, MT9V024, or MT9M024 provided by Aptina Imaging, San Jose, Calif. and includes an image sensor 16a, such as a CMOS sensor or a CCD sensor, and may further include an imager microcontroller 16b that performs several functions, and may be referred to as a system-on-chip (SOC) configuration. For example, the imager microcontroller 16b applies a distortion correction algorithm to the images received by the image sensor, and may also effect exposure control and color control of imager to achieve optimized image quality.

The microcontroller 18 may be any suitable type of microcontroller, such as the microcontroller model no. PIC24HJ128GP502 provided by Microchip Technology, Chandler, Ariz. The microcontroller 18 may be used for any number of functions, such as assisting the imager microcontroller 16b with distortion correction, viewpoint adjustment or other functions. The camera 11 will include one or both of the camera microcontroller 18 and the imager microcontroller 16b. The term 'controller' may be used generically in conjunction with carrying out a certain function. This terms 'controller' is intended to denote that any suitable type of controller is carrying out the function. The controller may therefore include one or both of the aforementioned microcontrollers 18 and 16b.

Figure 3:
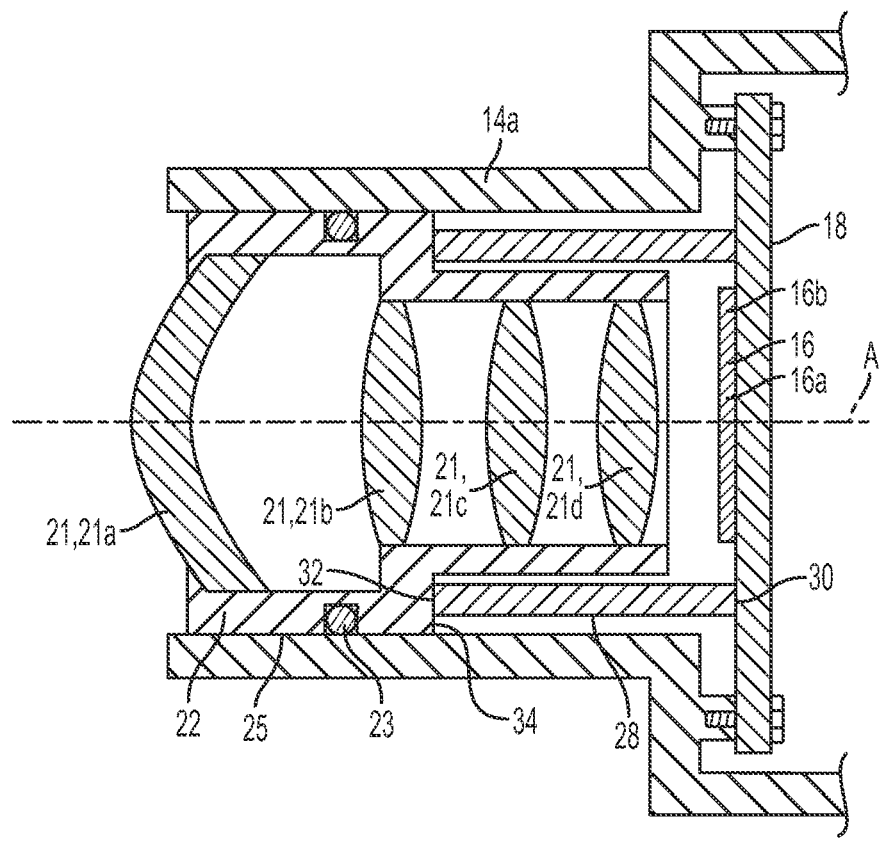
FIG. 3 is a sectional view of the camera shown in FIG. 2.

The lens assembly 12 is shown in more detail in FIG. 3. The lens assembly 12 includes a lens barrel 22 that holds a plurality of lenses 21. In the embodiment shown in FIG. 3, the plurality of lenses 21 includes four lenses 21a, 21b, 21c and 21d. The lens assembly 12 has an effective focal length associated with it, which is denoted by the variable f.

It will be understood that the following well-known relationship applies to the lens assembly 12:

$1/f=1/So+1/Si$, where f is the effective focal distance of the lens assembly 12, So is the effective distance of the lens assembly 12 to an object in the field of view of the lens assembly 12, and Si is the effective distance of the lens assembly 12 to the focused image of that object.

The lens assembly 12 has an effective distance from the image sensor 16a. In order for the image of an object to appear in focus on the image sensor 16a, the effective distance must be equal to Si. Put another way, the effective distance from the lens assembly 12 to the image sensor 16a (i.e. distance Si) controls the distance (i.e. distance So) at which an object in the field of view of the lens assembly 12 appears in focus on the image sensor 16a.

In the embodiment shown in FIG. 3, the lens barrel 22 is slidable in the lens holder 14a along an axis A, which is the optical axis of the lens assembly 12. A seal 23 (such as, for example, an o-ring or the like) is provided on the outer surface 25 so prevent foreign material such as dirt and moisture from migrating between the lens barrel 22 and the lens holder 14a past the seal 23 into the interior of the camera housing 14. Sliding the lens barrel 22 axially changes the effective distance of the lens assembly 12 to the image sensor 16a, which therefore changes the distance So in which objects appear in focus on the image sensor 16a. By sliding the lens barrel 22 to a first selected position the effective distance of the lens assembly 12 from the image sensor 16a is suitable for bringing objects that are a first effective distance away from the lens assembly 12 into focus on the image sensor 16a. The first effective distance of the objects from the lens assembly 12 may thus be denoted by So1, and the first effective distance of the lens assembly 12 from the image sensor 16a is denoted by Si1. By sliding the lens barrel 22 to a second selected position the effective distance of the lens assembly 12 from the image sensor 16a is suitable for bringing objects that are a second effective distance away from the lens assembly 12 into focus on the image sensor 16a. The second effective distance of the objects from the lens assembly 12 may thus be denoted by So2, and the second effective distance of the lens assembly 12 from the image sensor 16a is denoted by Si2. The actual distance So1 may be approximately 7 m. The actual distance So2 may, for example, be about 1 or 2 cm.

By selecting the desired maximum and minimum effective distances of objects that the lens assembly 12 is to be able to bring into focus, one can determine the maximum and minimum effective distances that the lens assembly 12 needs to be capable of achieving, from the image sensor 16a, for a given focal length value. When developing the lens assembly 12, and armed with knowledge of the desired maximum and minimum object distances So1 and So2, one can configure it to have a selected focal length to assist in providing easily achievable maximum and minimum distances of the lens assembly 12 from the image sensor 16a.

The lens assembly is movable via a lens adjustment structure shown at 28. Any suitable means of moving the lens assembly 12 over the range of maximum and minimum effective distances to the image sensor 16a may be provided. Traditional lens positioning systems used in traditional handheld cameras are generally too complex, too expensive, too large and too fragile for use in an automotive application. In the embodiment shown in FIG. 3, the lens adjustment structure 28 is a hollow cylindrical piezo actuator 28 to move the lens barrel 22 axially sufficiently so as to provide the selected range of effective distances (i.e. the range of distances between Si1 and Si2) of the lens assembly 12 from the image sensor 16a.

While the piezo actuator 28 may be capable of infinite adjustment of its length over its range of adjustment, it need not be. It may be sufficient to provide an actuator (such as, for example, a piezo actuator or the like) that has only two positions, a first position wherein the lens assembly 12 is at effective distance Si1 from the image sensor 16a (such as, for example, for viewing objects that are near, such as for viewing rain on the windshield), and a second position wherein the lens assembly 12 is at effective distance Si2 from the image sensor 16a (such as, for example, for viewing potential collision risks, street signs, traffic signals and/or the like).

In the embodiment shown in FIG. 3, the piezo actuator 28 has a first end 30 that is fixed to the microcontroller 18 and is thus fixed in position relative to the camera housing 14, and a second end 32 that is fixed to a shoulder 34 on the lens barrel 22. By controlling the voltage to the piezo actuator 28, the axial length of the piezo actuator 28 is controlled. Because the first end of the piezo actuator 28 is fixed in position relative to the camera housing 14, the second end 32 moves inwardly and outwardly axially based on the voltage applied to the piezo actuator 28, and thereby moves the lens barrel 22 and the lenses 21 axially relative to the image sensor 16a to control the effective distance of the lens assembly 12 from the image sensor 16a. By virtue of their capacity to move, the lenses 21 may be referred to as adjustable lenses.

By physically connecting the piezo actuator 28 directly to the microcontroller 18, the microcontroller 18 may conveniently be electrically connected to the piezo actuator 28 to supply a suitable voltage to it to control its length. It is alternatively possible for the piezo actuator 28 to be electrically (and physically) connected to some other component, such as the imager microcontroller 16b. Thus, the controller (as defined above) may be said to be operatively connected to the piezo actuator 28, and to the adjustable lenses 21 to control the effective distance of the lens assembly from the image sensor 16a.

Depending on the configuration and selection of the lenses 21, the range of movement of the lens assembly 12 required to provide the range of distances of objects whose images appear in focus on the image sensor 16a, may be several tens or hundreds of microns, which is attainable using a piezo actuator.

Using a piezo actuator 28 is advantageous over an electromechanical adjustment mechanism as found in traditional handheld cameras since it is relatively small and relatively robust, having fewer parts and more particularly fewer moving parts, while still providing sufficient movement of the adjustable 21 to provide the camera 11 with the desired range of distances at which objects are in focus on the imager 16.

The piezo actuator 28 has been shown to move the entire lens barrel 22 with all the lenses 21 contained therein. It is alternatively possible to provide a configuration wherein the lens barrel 22 is fixed to the lens holder 14a and holds one or more fixed lenses, and wherein the piezo actuator 28 itself holds one or more adjustable lenses and is movable (i.e. extendable) axially so as to move the lenses it holds axially. In such an embodiment, it will be noted that movement of the piezo actuator 28 will change both the effective distance Si of the lens assembly to the image sensor 16a and will simultaneously change the effective focal length associated with the lens assembly. The relationship between the position of the adjustable lenses and the effective focal length and the effective distance Si can be determined empirically to permit one to develop a lens assembly that has the ability to provide focused images of objects over a range of selected distances from the lens assembly.

Figure 4:
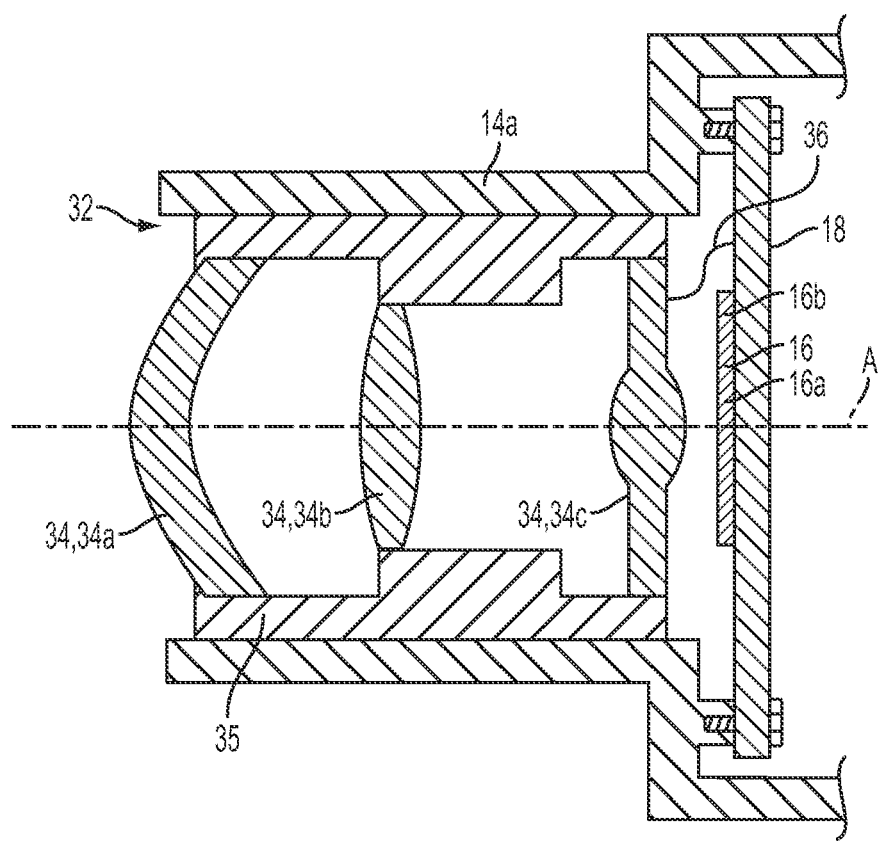
FIG. 4 is a sectional view of the camera shown in FIG. 1 with a second lens assembly in accordance with another embodiment of the present invention.
Figure 5:
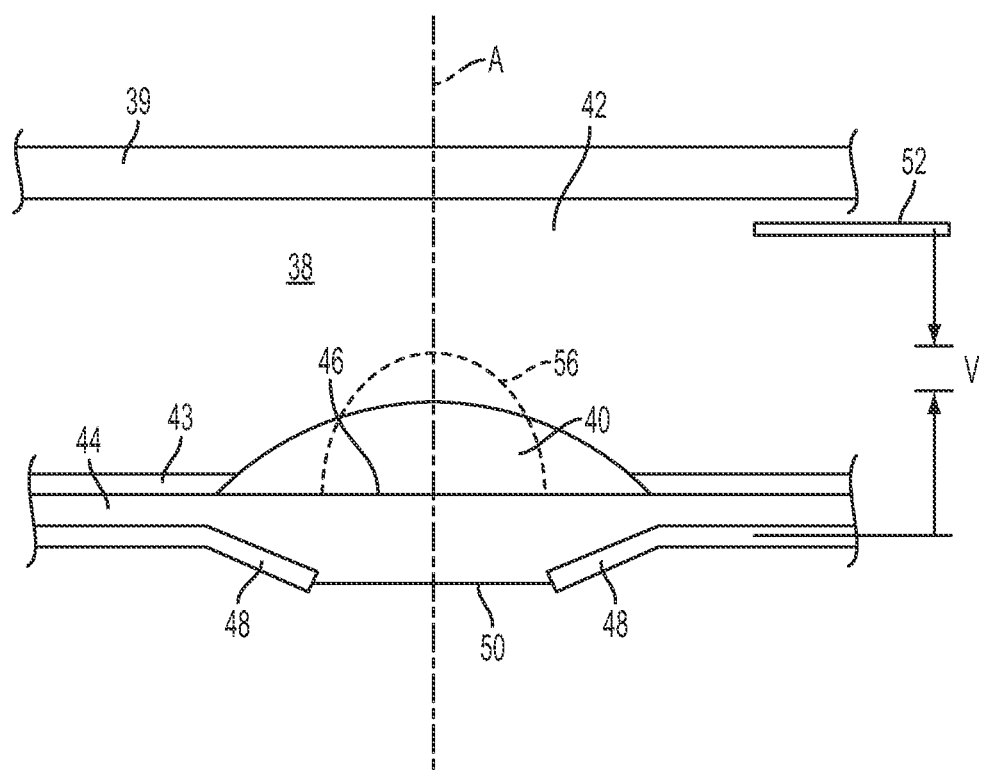
FIG. 5 is a magnified view of a lens adjustment structure for the lens assembly shown in FIG. 4.

Reference is made to FIG. 4 which shows a lens assembly 32 that can be used in the camera 11 instead of the lens assembly 12 in accordance with another embodiment of the present invention. The lens assembly 32 includes a plurality of lenses 34, including a first fixed lens 34a, a second fixed lens 34b, and an adjustable lens 34c. In this embodiment the adjustable lens 34c contains a lens element that is capable of changing its shape to adjust the focal distance for the lens 34c and to adjust the effective focal length of the group of lenses in the lens assembly 32. The lenses 34 are held in a lens barrel 35 which is fixedly mounted to the lens holder 14a. The adjustable lens 34c may be what is referred to as a liquid lens, whose radius of curvature can be controlled via a suitable voltage supplied to the lens. An example of the basic elements of the lens adjustment structure of such a lens is shown in FIG. 5. The structure includes a dielectric chamber 38 that is defined at least in part by a transparent first chamber wall 39 and a transparent second chamber wall 44. The chamber 37 contains a drop of an insulator liquid 40 and is otherwise filled with a conductor liquid 42. The two liquids 40 and 42 are transparent and not miscible and have substantially the same density. A surface treatment 43 is provided on a portion of the chamber wall 44 is treated so as to retain the insulating liquid thereon in a selected region 46, along axis A. An electrode 48 is shown overlapping partially with the region 46 of the wall 44. The electrode 48 has an aperture 50 that is aligned with axis A. A second electrode 52 is provided in contact with the conductive liquid 42. When no voltage is applied between the electrodes 48 and 52, the insulating liquid 40 occupies the entirety of region 46 and has a first curvature. When a voltage is applied between the electrodes 48 and 52 an electrical field is generated which deforms the insulative liquid inwardly from the edges of the region 46. Increasing the voltage increases the strength of the field which progressively compensates for the progressively increasing distance between the insulative liquid 40 and the electrode 48 inwardly towards the axis A. As a result, increasing the voltage progressively urges the drop of liquid 40 inwardly. As the drop occupies a smaller portion of the region 46, its radius of curvature decreases, which changes its focal length. An exemplary shape of the drop of liquid 40 while a selected voltage is applied is shown in dashed outline at 56. An example of such a lens is described in U.S. Pat. No. 6,369,954, which is incorporated herein by reference in its entirety.

So-called liquid lenses similar to that described above may be provided by any suitable provider, such as Varioptic SA of Lyon, France.

As shown in FIG. 4, an electrical connection 36 is provided between the camera microcontroller 18 and the adjustable lens 34c in order to apply and control the voltage discussed above.

The liquid lens described above is advantageous in that it avoids the use of sliding mechanical motion and O-rings which are involved in the embodiment shown in FIG. 3.

It will be noted that adjusting the shape of the liquid lens 34c changes the effective focal length "f" for the lens assembly 32, and also changes the effective distance of the lens assembly to the image sensor 16*a*. As a result, the distance at which objects in the field of view of the lens assembly 32 will appear in focus on the image sensor 16*a* may be controlled. The relationship between focal length and the distance Si can be determined empirically and the lens properties may be selected to provide a suitable range of distances Si and focal lengths f that work for the particular vehicular camera application desired.

Figure 6:
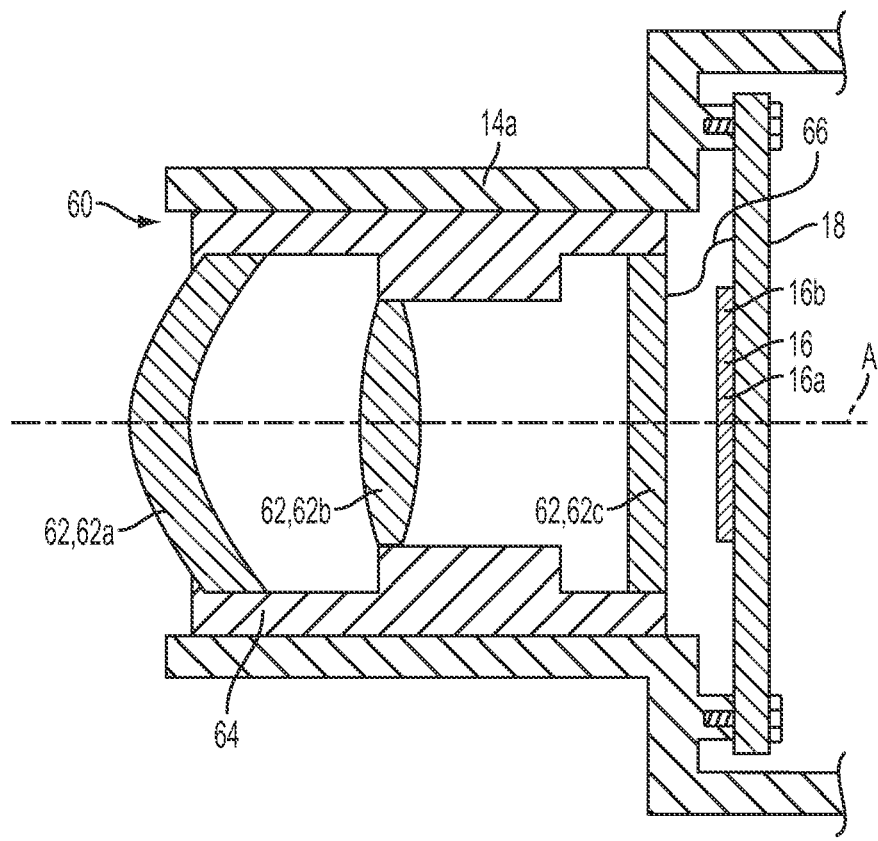
FIG. 6 is a sectional view of the camera shown in FIG. 1 with a third lens assembly in accordance with another embodiment of the present invention.
Figure 7:
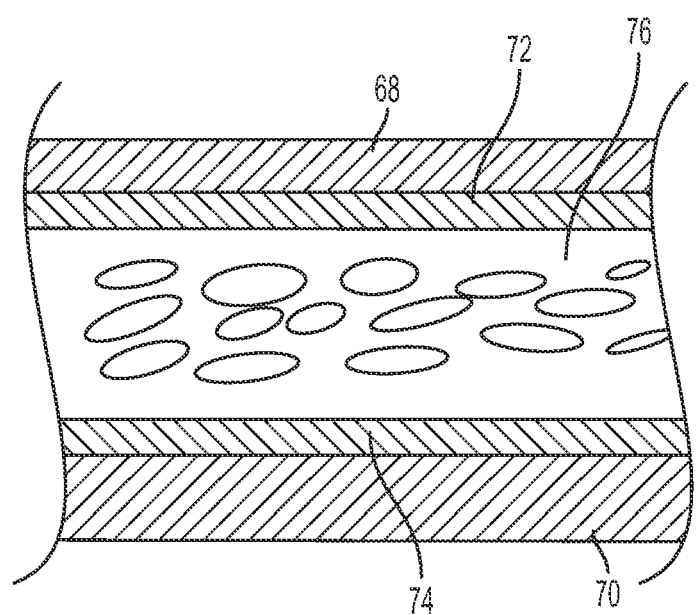
FIG. 7 is a magnified view of a lens adjustment structure for the lens assembly shown in FIG. 6.

Reference is made to FIG. 6, which shows another lens assembly 60 that can be used in the camera 11 instead of the lens assembly 12 in accordance with another embodiment of the present invention. The lens assembly 60 shown in FIG. 6 is similar to the lens assembly 32 in that it may optionally employ one or more fixed lenses (shown at 62*a* and 62*b*) in a lens barrel (shown at 64) that is fixedly connected to the lens holder 14*a*, and an adjustable lens shown at 62*c* positioned inwardly of the fixed lenses 62*a* and 62*b*. The adjustable lens 62*c* in this embodiment may be a liquid crystal lens which is capable of adjustment of its index of refraction by different amounts radially away from the center axis A. This control permits the lens 62*c* to focus light in spite of being planar on both its faces. An example of the lens adjustment structure is shown in FIG. 7. The lens adjustment structure includes first and second substrate layers 68 and 70, first and second alignment layers 72 and 74 and the liquid crystals 76 and an electromagnetic source (not shown). Increasing the voltage applied increases the gradient of the index of refraction along the radius of the lens 62*c* thereby changing the focal length of the lens 62*c*. Such a lens is shown and described in U.S. Publication No. US2010/0007807, which is hereby incorporated herein by reference in its entirety. Such a lens may be provided by LensVector, Inc. in Mountain View, Calif., USA. As with the embodiment shown in FIG. 4, controlling the voltage changes the focal length of the adjustable lens 62*c*, which changes the effective focal length of the lens assembly 60 and the effective distance of the lens assembly 60 to the image sensor 16*a*, so as to control the distance at which objects appear in focus on the image sensor 16*a*.

As shown in FIG. 6, an electrical connection is provided between the camera microcontroller 18 and the adjustable lens 62*c* in order to apply and control the voltage discussed above.

In the embodiments shown in FIGS. 4-6 the innermost lens was the adjustable lens so simplify the electrical connection to the microcontroller 18. It is alternatively possible however for the adjustable lens to not be the innermost lens in the lens assembly, as shown in FIG. 7, in which lenses 80*a*, 80*b* and 80*d* are fixed and lens 80*c* is adjustable. In order for power to be sent to the lens 80*c*, an electrical conduit 82 can be applied to the inner surface of the lens barrel shown at 81. The technology used to apply the electrical conduit may be a simply spray nozzle, or a more sophisticated system akin to that used in inkjet printing, or any other suitable technology that results in a sufficiently thin layer for the electrical conduit that it does not prevent the installation of the innermost lens 80*d* into the lens barrel. From any suitable point on the lens barrel (such as, for example, at or near its innermost end), the electrical conduit can connect to a standard electrical connector that passes between the lens barrel and the microcontroller 18.

Figure 8:
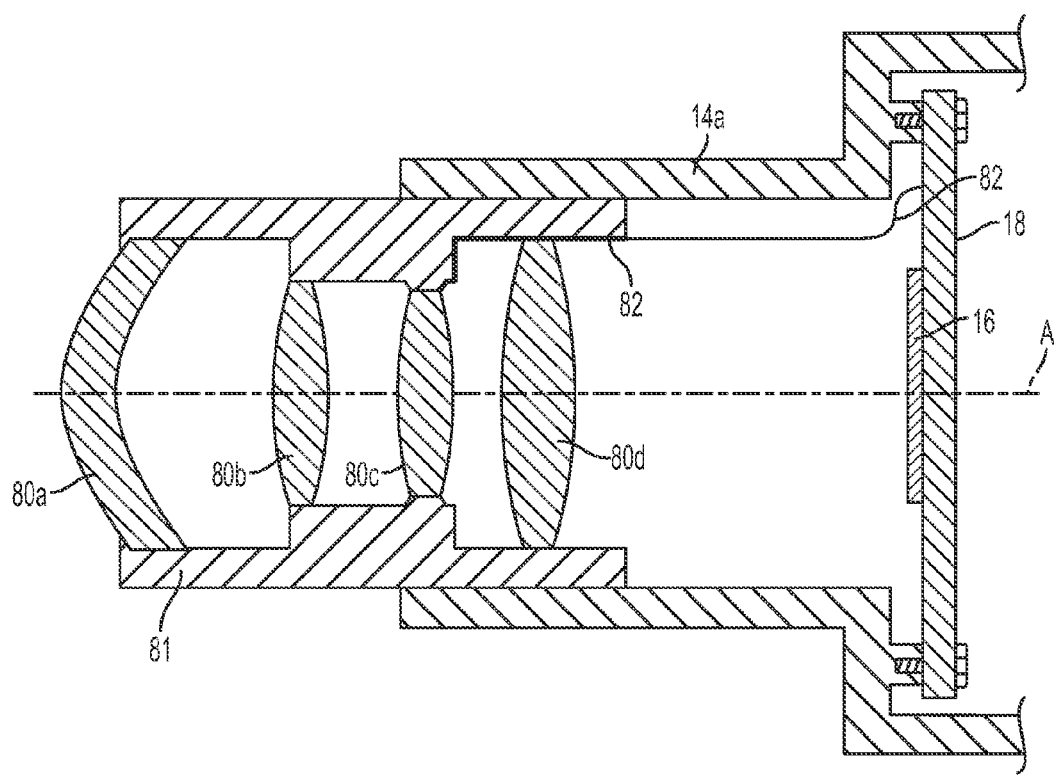
FIG. 8 is a view of a camera with an adjustable lens that is positioned in a different position than the adjustable lenses shown in FIGS. 4 and 6.

The particular type of adjustable lens that makes up lens 80*c* is not important; FIG. 8 is intended to convey the concept of providing an electrical connection between the microcontroller 18 and an adjustable lens that is not the innermost lens.

One of the applications described above for having adjustable focus in the lens assembly is to permit the camera 11 to be used for multiple purposes that involve detection of objects at different distances from the camera, such as, detection of traffic signs and signals, and detection of rain on the windshield. Another application of a lens assembly with adjustable focus is that it can greatly simplify the assembly of the camera 11. In a typical manufacturing process for a fixed focus vehicular camera, once the imager 16 is installed in the housing and the lens assembly is ready for installation, a complex focusing step is carried out using relatively expensive multi-axis automated robotic systems for precisely positioning the lens assembly in the camera housing, and adjusting its position until the image captured by the imager is considered to be in sufficiently good focus, at which point the robotic system cures adhesive on the lens assembly to fix it permanently in place. This step in the manufacturing process is relatively complex, relatively expensive, and uses relatively expensive equipment, and is also relatively time consuming.

A camera with adjustable focus such as those described above may be used to advantage in other ways. For example, it is known that temperature change can cause thermal expansion or contraction of the lens barrel and the lens holder of a camera, which can shift the position of the lens assembly relative to the image sensor. Additionally, the index of refraction of the lens themselves may change with temperature. As a result, an object that appears in focus on the image sensor of the camera at a first temperature may not appear in focus on the image sensor at a second temperature. A camera with adjustable focus however, can compensate for changes in temperature so as to ensure that objects at selected distances from the camera remain in focus throughout a range of temperatures. One way of achieving this is to provide a temperature sensor (shown at 150 in FIG. 2) and to program the controller (such as, for example, the microcontroller 18) to adjust the focus of the lens assembly by a selected amount based on the temperature sensed by the temperature sensor. The microcontroller 18 could, for example, store a look up table that indicates the voltage to apply to focus objects at selected distances at different temperatures. Temperature sensor 150 can also be placed inside the camera 11 as a part of microcontroller 18 or lens assembly 12. It is often preferred to place the temperature sensor inside the camera since the temperature outside of the camera is typically lower than the temperature inside the camera where the lens assembly is more sensitive to produce effective length change.

Figure 9:
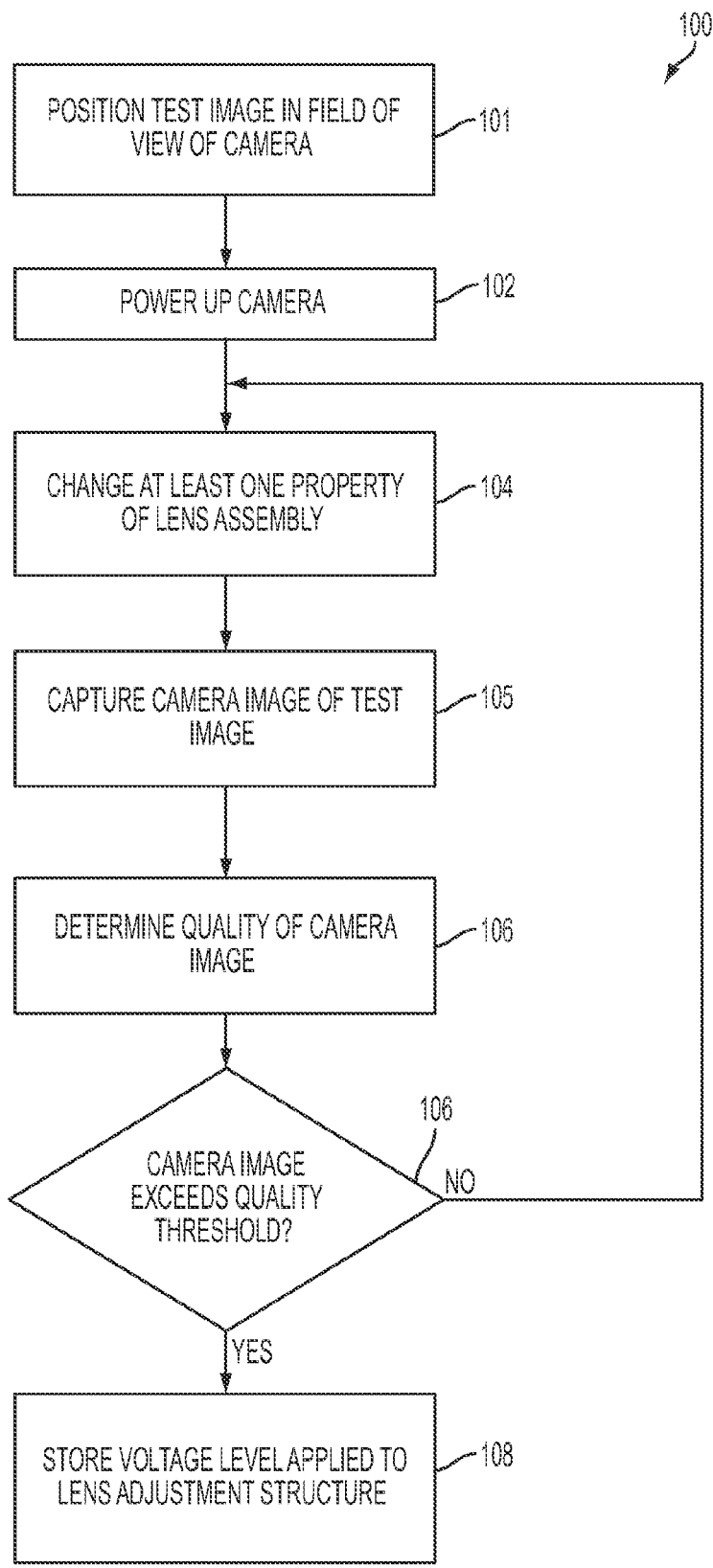
FIG. 9 is a flow diagram illustrating a method of focusing the camera during manufacture of the camera.

Using a camera with adjustable focus such as those described above, a method 100 for focusing the camera 11 is shown in FIG. 9, in accordance with an embodiment of the present invention. At step 101, the camera 11 may be positioned in a test fixture so that a known test image appears in the field of view of the camera 11 at a selected distance from the camera 11. The camera 11 is powered up at step 102. This may be the first time that the camera 11 is powered up and may be prior to installation of the camera in the vehicle in which it will be used. At step 104 a sweeping external control signal is applied to the lens adjustment structure. In other words a voltage or other control signal is applied to the lens adjustment structure to gradually adjust at least one property of the lens assembly over a selected range, wherein the at least one property is selected from the effective focal length of the lens assembly and the effective distance of the lens assembly to the image sensor. The range may be the entire range of values for the at least one property that the lens assembly is capable of achieving, or may be a subset of that entire range. After the at least one property of the lens assembly is adjusted, step 105 is carried out in which the image sensor is used to capture an image of the test image. The captured image is referred to as a camera image. The focus quality of the camera image is checked at step 106 to determine if it meets or exceeds a selected focus quality threshold. In other words, the camera image is checked to determine if it is sufficiently in focus so that the camera 11 is usable for its intended purpose or purposes. This may be carried out in any suitable way, such as by checking the sharpness of the captured camera image. If the quality of the camera image is determined not to exceed the quality threshold, then steps 104, 105 and 106 are iteratively carried out until the quality of the camera image does meet or exceed the quality threshold. If the quality of the camera image is determined to meet or exceed the quality threshold, then step 108 is carried out in which some data related to the adjusted value of the at least one property is stored. In suitable embodiments, step 108 would involve storing in non-volatile memory the value of the voltage applied to the lens adjustment structure that permitted the captured camera image to meet or exceed the quality threshold.

Once the first voltage has been recorded, it is optionally possible for a test image to be presented in the field of view of the camera 11 at a second selected distance from the camera 11. The method described above may then be carried out again to determine a second voltage level to apply to the lens adjustment structure to bring the test image at the second selected distance into focus. The second voltage may then also be recorded into non-volatile memory.

It will be understood that the steps of the method 100 need not be carried out in the precise order shown in FIG. 9. For example, the camera 11 could alternatively be powered up prior to positioning the test image in its field of view. As another example, the steps of capturing a camera image using the image sensor (step 105) and determining if the quality of the captured camera image exceeds a selected quality threshold (step 106) could take place before the step of sending a control signal to the lens adjustment structure to gradually adjust at least one property of the lens assembly over a selected range.

When the camera 11 is powered up subsequently, this voltage level can be applied so as to bring the camera 11 to a state where it can focus on objects at one of the selected distances.

By using the method described above, expensive robotic equipment is not required for adjusting and holding the lens assembly and curing the adhesive holding the lens assembly to the camera housing as is done for some cameras of the prior art.

Throughout the disclosure and claims the terms 'quality' and 'focus quality' are used. It will be noted that even though the qualifier 'focus' is sometimes omitted from the term, both terms 'quality' and 'focus quality' are intended to denote the same thing, which is focus quality.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094; and/or 6,396,397, and/or U.S. provisional application, Ser. No. 61/613,651, filed 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/567,150, filed Dec. 6, 2011; Ser. No. 61/565,713, filed Dec. 1, 2011; Ser. No. 61/559,970, filed Nov. 15, 2011; Ser. No. 61/552,167, filed Oct. 27, 2011; Ser. No. 61/540,256, filed Sep. 28, 2011; Ser. No. 61/513,745, filed Aug. 1, 2011; Ser. No. 61/511,738, filed Jul. 26, 2011; and/or Ser. No. 61/503,098, filed Jun. 30, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010 and published Dec. 16, 2010 as International Publication No. WO 2010/144900, and/or U.S. patent application Ser. No. 13/202,005, filed Aug. 17, 2011, now U.S. Pat. No. 9,126,525, which are hereby incorporated herein by reference in their entireties.

The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,965,336; 7,004,606; and/or 7,720,580, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170; and/or U.S. provisional application, Ser. No. 61/511,738, filed Jul. 26, 2011; and/or Ser. No. 61/503,098, filed Jun. 30, 2011, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526, 103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional application Ser. No. 60/618,686, filed Oct. 14, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018-A1, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 and published Jun. 28, 2012 as U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety). Optionally, the vision system (utilizing a forward and/or rearward facing camera and other cameras disposed at the vehicle with exterior fields of view) and/or the camera or cameras as part of a vehicle vision system comprising or utilizing a plurality of cameras (such as utilizing a rearward facing camera and sidewardly facing cameras and a forwardly facing camera disposed at the vehicle), may provide a display of a top-down view or birds-eye view of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or International Publication No. WO 2012/075250, and/or U.S. patent application Ser. No. 13/333,337, filed Dec. 21, 2011 and published Jun. 28, 2012 as U.S. Publication No. US-2012-0162427, and/or U.S. provisional application, Ser. No. 61/588,833, filed Jan. 20, 2012; Ser. No. 61/570,017, filed Dec. 13, 2011; Ser. No. 61/559,970, filed Nov. 15, 2011; Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 7,855,755; 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538, 724, filed Jun. 13, 2005 and published Mar. 9, 2006 as U.S. Publication No. US-2006-0050018, which are hereby incorporated herein by reference in their entireties.

Figure 10:
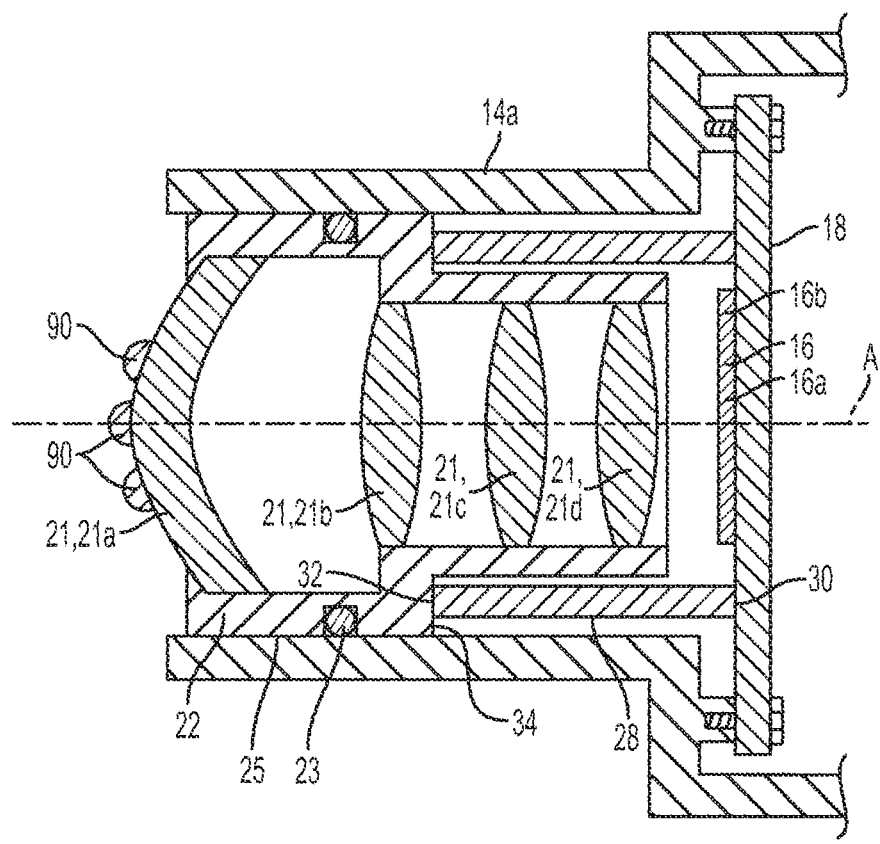
FIG. 10 is a sectional view of another camera of the present invention, shown with water droplets on the top surface of the lens assembly.

In the embodiment of FIG. 10, the mechanical adjustment structure 28, such as a piezo actuator or the like, is used to vaporize water droplets 90 that deposit on the top of the camera lens. For the cameras that are mounted outside of vehicle, during rain or snow or in the situation of splashing of water to the camera on road, water droplets may deposit and attach on the lens top surface and cause blockage or smearing of the captured images. For the cameras that are mounted inside the vehicle compartment, there are also opportunities that moisture condensation or spill of beverages or the like may cause water droplets to deposit on the surface of lenses. It is desirable to get rid of the water droplets on the lens surface for the proper operation of the cameras and the safety of the driver or pedestrian. Traditionally, water droplets are wiped away manually by hand from the lens surface when the driver notices the water drops existing on lens surface. In automotive camera application, it may be impractical or inconvenient to do so. It is known that vibrating a surface that water droplets contact at specific frequencies and amplitude can vaporize water droplets. Such application can be seen in consumer home humidifiers that utilize a piezo transducer that operates in high frequency to vaporize water and moisturize a room.

The piezo transducer in the embodiment of FIG. 10 can be used for the purpose of vaporizing and cleaning water droplets on the camera lens surface. The piezo actuator is driven by the controller with a frequency or frequencies and magnitude that are suitable to vaporize water droplets. The activating of the vaporization action can be controlled by the driver through a mechanical switch or a touch button on the display or other means when he or she observes water on lens surface directly or through the camera image on display. It is also feasible to include water droplet detection algorithm in the controller that runs software with an image processing algorithm that detects water droplets on the lens surface through camera's captured images. The controller software thus may detect water droplets and may activate or generate a signal to the piezo actuator to vaporize water on the lens surface.

Throughout the disclosure and claims the terms 'quality' and 'focus quality' are used. It will be noted that even though the qualifier 'focus' is sometimes omitted from the term, both terms 'quality' and 'focus quality' are intended to denote the same thing, which is focus quality.

The spirit of the present invention does not exclude any suitable types of structures, components and methods of adjusting lens effective focal length and/or effective focal distance, which may include, but not limit to, mechanical, electrical, and optical means.

While the above description constitutes a plurality of embodiments of the present invention, it will be appreciated that the present invention is susceptible to further modification and change without departing from the fair meaning of the accompanying claims.

The invention claimed is:

1. A method of focusing a camera, said method comprising:
   (a) providing a camera having a housing, an image sensor and a lens assembly;
   (b) positioning a test image in the field of view of the camera;
   (c) powering the camera;
   (d) adjusting the value at least one property of the lens assembly, wherein the at least one property of the lens assembly comprises at least one of (i) an effective focal length of the lens assembly and (ii) an effective distance of the lens assembly from the image sensor;
   (e) capturing an image of the test image using the camera;
   (f) determining if the quality of the captured image exceeds a selected quality threshold;
   (g) iteratively repeating steps (d), (e) and (f) until the quality of the camera image exceeds the selected quality threshold;
   (h) storing data related to the adjusted value of the at least one property of the lens assembly that results in the quality of the camera image exceeding the selected quality threshold;
   wherein the camera includes a lens adjuster and the lens assembly includes at least one adjustable lens that is adjustable via the lens adjuster, and wherein adjustment of a voltage applied to the lens adjuster causes adjustment of the value of at least one property of the lens assembly in step (d); and
   wherein the value of the voltage applied to the lens adjuster that results in the camera image exceeding the quality threshold is stored in step (h).

2. A method as claimed in claim 1, wherein adjusting the value of at least one property of the lens assembly comprises actuating an actuator that is operable to adjust the value of at least one property of the lens assembly.

3. A method of focusing a camera, said method comprising:
   (a) providing a camera having a housing, an image sensor and a lens assembly;
   (b) positioning a test image in the field of view of the camera;
   (c) powering the camera;
   (d) adjusting the value at least one property of the lens assembly, wherein the at least one property of the lens assembly comprises at least one of (i) an effective focal length of the lens assembly and (ii) an effective distance of the lens assembly from the image sensor;
   (e) capturing an image of the test image using the camera;
   (f) determining if the quality of the captured image exceeds a selected quality threshold;
   (g) iteratively repeating steps (d), (e) and (f) until the quality of the camera image exceeds the selected quality threshold;
   (h) storing data related to the adjusted value of the at least one property of the lens assembly that results in the quality of the camera image exceeding the selected quality threshold;

wherein adjusting the value of at least one property of the lens assembly comprises actuating an actuator that is operable to adjust the value of at least one property of the lens assembly; and actuating said actuator to vaporize water droplets at a surface of the lens assembly.

4. A method as claimed in claim 3, wherein the camera includes a lens adjuster and the lens assembly includes at least one adjustable lens that is adjustable via the lens adjuster, and wherein adjustment of a voltage applied to the lens adjuster causes adjustment of the value of at least one property of the lens assembly in step (d).

5. A method as claimed in claim 3, wherein said actuator comprises a piezo actuator.

6. A method as claimed in claim 5, wherein actuating said actuator to vaporize water droplets comprises actuating said actuator responsive to a detection of water droplets at the surface of the lens assembly.

7. A method as claimed in claim 3, wherein the camera includes a lens adjuster and wherein the lens assembly includes an adjustable lens that is movable axially along an optical axis of the lens assembly by the lens adjuster.

* * * * *